(12) United States Patent
Bennett et al.

(10) Patent No.: US 7,107,369 B2
(45) Date of Patent: Sep. 12, 2006

(54) CONNECTING STORAGE DEVICES TO A PROCESSOR-BASED DEVICE

(75) Inventors: Joseph A. Bennett, Roseville, CA (US); Knut S. Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 10/324,687

(22) Filed: Dec. 19, 2002

(65) Prior Publication Data
US 2004/0123002 A1 Jun. 24, 2004

(51) Int. Cl.
G06F 13/12 (2006.01)
G06F 12/00 (2006.01)

(52) U.S. Cl. .................... 710/62; 710/68; 710/72; 710/74; 711/115; 719/321

(58) Field of Classification Search ............... 710/62, 710/68, 72, 73, 74
See application file for complete search history.

(56) References Cited

U.S. PATENT DOCUMENTS

| | | | |
|---|---|---|---|
| 5,812,796 A * | 9/1998 | Broedner et al. ........... 710/302 |
| 6,145,029 A * | 11/2000 | Deschepper et al. .......... 710/36 |
| 6,408,351 B1 * | 6/2002 | Hamdi et al. ................ 710/63 |
| 6,618,788 B1 * | 9/2003 | Jacobs ........................ 710/315 |
| 6,636,922 B1 * | 10/2003 | Bastiani et al. ............. 710/305 |
| 6,639,791 B1 * | 10/2003 | Su .............................. 361/685 |
| 6,807,600 B1 * | 10/2004 | Bissessur et al. ........... 710/313 |
| 6,854,045 B1 * | 2/2005 | Ooi et al. .................... 711/202 |
| 6,915,363 B1 * | 7/2005 | Wood et al. .................. 710/74 |
| 2001/0052038 A1 * | 12/2001 | Fallon et al. ................. 710/68 |
| 2003/0065857 A1 * | 4/2003 | Lin ............................. 710/302 |
| 2003/0163634 A1 * | 8/2003 | Kim ............................ 711/103 |
| 2003/0191874 A1 * | 10/2003 | Drescher et al. .............. 710/38 |
| 2004/0019709 A1 * | 1/2004 | Bissessur et al. ............. 710/14 |
| 2004/0039851 A1 * | 2/2004 | Tang et al. .................... 710/5 |
| 2004/0103163 A1 * | 5/2004 | Lin et al. .................... 709/211 |

OTHER PUBLICATIONS

Patterson and Hennessy; Computer Organization & Design, The Hardware/Software Interface; 1998; Morgan Kaufmann Publishers; Second Edition, p. 109.*
USB 2.0 Specification, Apr. 27, 2000, pp. 284,285,289,290.*
The Authoritative Dictionary of IEEE Standards Terms; 2000; IEEE Press; Seventh Edition=>"slave " and "cache " definitions.*
Universal Serial Bus Specification, Revision 2.0, Apr. 27, 2000, p. 278.*
SERIAL ATA: High Speed Serialized AT Attachment, Revision 1.0, Aug. 29, 2001; APT Technologies, Inc., et al.

* cited by examiner

*Primary Examiner*—Kim Huynh
*Assistant Examiner*—Alan S Chen
(74) *Attorney, Agent, or Firm*—Trop, Pruner & Hu, P.C.

(57) ABSTRACT

In processor-based systems, loss of ports may be avoided while connecting mass storage drives or devices at a host level. In one embodiment, a slave device (e.g., a cache or an accelerator) may be interposed between a host device and a master storage device (e.g., a disk drive) over a serialized link, providing accelerated communications between the host device and the master storage device through the slave device both coupled on select one of one or more ports available at the host device for device connections.

29 Claims, 5 Drawing Sheets

CONNECTING STORAGE DEVICES TO A PROCESSOR-BASED DEVICE

BACKGROUND

This invention relates generally to processor-based systems and, more particularly, to storage interfaces or links utilized to connect mass storage devices with a processor-based device.

Many competing storage interface standards have been defined, playing a critical role in creating more affordable systems with performance, reliability, scalability, and interoperability generally needed for a host of storage applications. For example, a storage interface standard involving point-to-point connectivity may provide significant performance and reliability advantage over a shared connectivity approach. Other examples of serial storage interfaces may have different topology. For instance, Fibrechannel generally is connected in a loop with devices daisy-chained together, while another serial storage interface is connected in a hub and star hierarchy. Another storage interface standard uses a parallel protocol for connecting master and slave devices on a single, parallel cable in one specific example of legacy parallel AT attachment (ATA). Nonetheless, a storage interface may enable a controller to communicate with a given storage drive or device through a port to which it is connected. Because only one storage drive or device may be directly connected to a host via a dedicated link on a port, the entire port may have to be dedicated to that storage device itself. For example, a master storage device connected to a port cannot share the same port with another device in a slave mode. As a result, loss of the port alone causes fewer storage interface-compliant devices to be plugged into a system.

While a parallel storage interface may form a cable nest of multiple conductor ribbon cables affecting system's airflow and cooling, a serial storage interface may not allow communication to a slave device on a serialized link or a cable. When using a standard set of protocols, a single, fully-equipped storage interface-compliant device that is capable of interpreting all commands relating to the protocols may only be deployed. Additionally, in some parallel storage interfaces, the drives or devices on a shared common cable may need to be jointly qualified, resulting in unnecessary overhead in order to qualify all possible combinations of drives or devices sharing the same cable. In view of the problems set forth above and without incurring the loss of a port, an additional drive or device may not be desirably added on the same port.

Thus, there is a continuing need for better ways to connect mass storage devices to a processor-based device, especially in processor-based systems.

DETAILED DESCRIPTION

Figure 1:
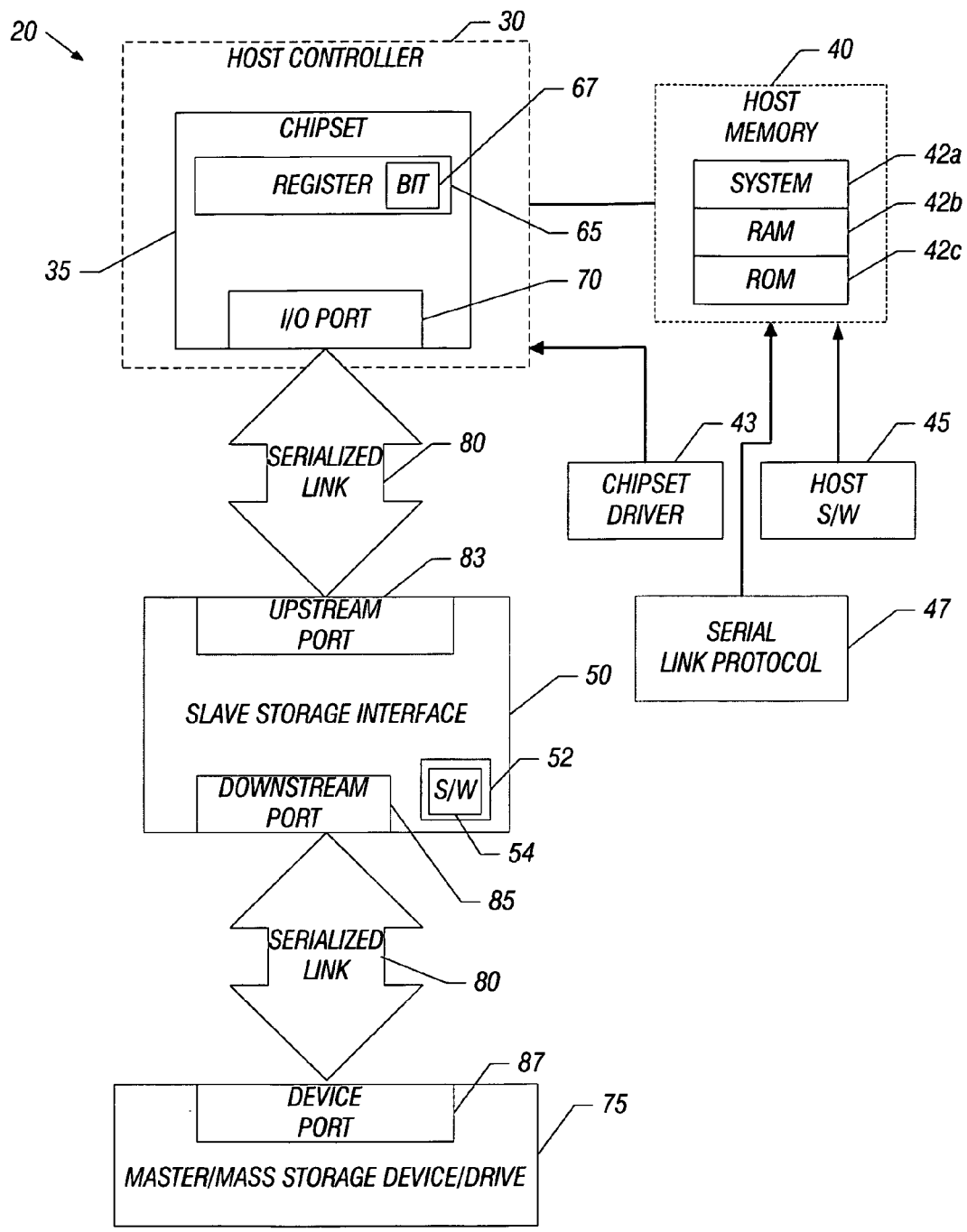
FIG. 1 is a schematic depiction of one embodiment of the present invention.

A host device 20, as shown in FIG. 1, may include a host controller 30 to communicate with one or more serially connected mass storage drives and/or devices while allowing accelerated communications through an interface, such as a slave device, which may be a storage device in accordance with some embodiments of the present invention. For example, the accelerated communications may involve either self-identification based communications in the presence of a particular piece of software, such as a chipset driver or benign and/or transparent communications in the absence of an associated driver for a chipset while two devices may be communicating, i.e., a mass or master storage device and a slave device based on a shared master-slave relationship over a common cable or a serialized link. While the host controller 30 may be coupled to a host memory 40 including a system memory 42a, a random access memory (RAM) 42b, and a read-only memory (ROM) 42c, the host controller 30 may comprise a chipset 35 that may enable the accelerated communications to and from the host device 20, in some embodiments.

The chipset 35 may receive a chipset driver 43 and the host memory 40 may store a host software (S/W) 45 and a serial link protocol 47, as one example. In the chipset 35, a register 65 may include at least one adaptable data bit 67. Using the host software 45, the host controller 30 may configure the data bit 67 in many examples of the present invention. At the host controller 30, an input/output (I/O) port 70 may be provided in the chipset 35 to receive a serialized link 80, serially connecting a master storage device 75 to the host device 20 via a slave storage interface 50 according to many embodiments of the present invention. In some embodiments, multiple I/O ports 70 may be provisioned in the chipset 35 to provide device connections. Essentially, the I/O port 70 in certain embodiments enables communications to and/or through a device either connected serially or in a parallel setup.

The slave storage interface 50 may be interposed between the host device 20 and the master storage device 75 through the I/O port 70, i.e., using one of one or more available ports for device connections in some cases. The data bit 67 of the register 65 may be adapted to indicate different states (e.g., states including an active and non-active state) of data associated with the slave storage interface 50, according to some embodiments. In one particular example of the present invention, the state of the data bit 67 may control the connection of the slave storage interface 50 to the chipset 35 according to the communications therebetween.

Examples of the master storage device 75 include any storage drive or device capable of retrievably storing data in a nonvolatile manner or accessing data such that data may be communicated over a link or an interface to and from the host device 20. For instance, mass storage drives or devices including a hard disk drive (HDD), a digital versatile disk (DVD) drive, a compact disk read/write (CD-RW) combo drive and/or a compact disk read only memory (CDROM) drive may be deployed for access over the serialized link 80.

For the purposes of providing accelerated communications between the host device 20 and the slave storage device 50 over the serialized link 80 via one of one or more available ports for device connections (e.g., using the I/O port 70), a memory 52 may store interface software (S/W)

54. Since the same number of master storage device 75 may be connected to the host device 20 regardless of whether the slave storage device 50 exists or not, and with the slave storage device 50 present, in some embodiments many applications executing at the host controller 30 may be accelerated. In this manner, enhanced system performance may be obtained in some situations at substantially no loss of ports available for device connections. To connect with the serialized link 80, in some embodiments, the slave storage interface 50 may comprise an upstream port 83. Likewise, a downstream port 85 may be provided for connecting with a device port 87, as shown located at the master storage device 75, consistent with many examples of the present invention.

Using the serialized link 80, the host software 45 in conjunction with the interface software 54 may initialize communications between the slave storage interface 50 and the host device 20, and with the master storage device 75 as well. Specifically, depending upon the chipset driver 43 and the serial link protocol 47, the host software 45 may connect the slave storage interface 50 over the serialized link 80 to the host device 20, providing the accelerated communications.

Figure 2:
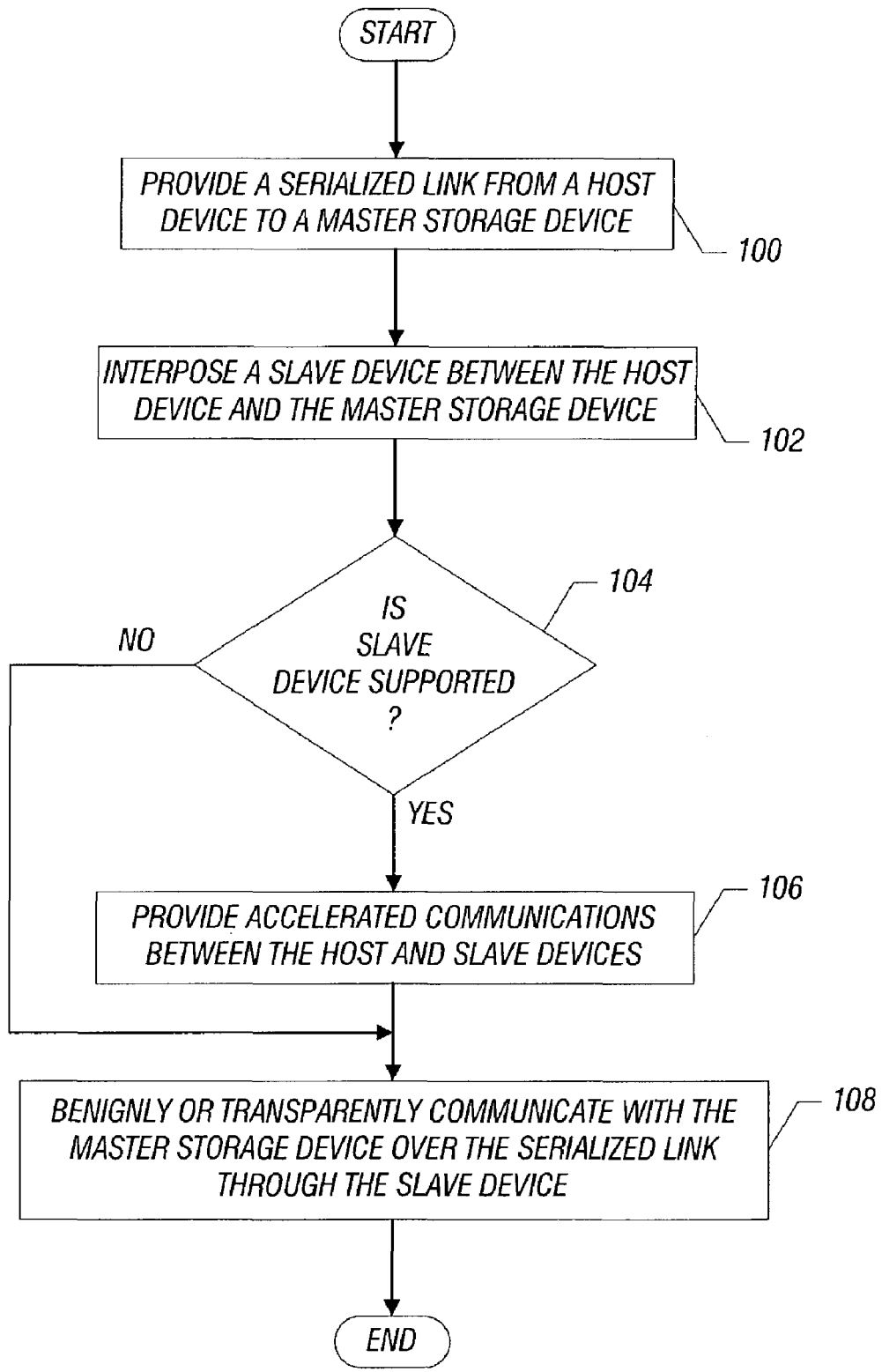
FIG. 2 is a flow chart for software utilized on the host controller shown in FIG. 1 in accordance with one embodiment of the present invention.

Referring to FIG. 2, the serialized link 80 may be provided from the host device 20 to the master storage device 75 for connecting both in a serial fashion, as indicated at block 100. When the slave storage interface 50 is interposed between the host device 20 and the master storage device 75 on the serialized link 80, at block 102, a check at diamond 104 may determine whether or not the slave storage interface 50 is supported by the host device 20. If the host device 20 determines that support is available to communicate at block 106, accelerated communications between the host device 20 and the slave storage interface 50 may be undertaken. Otherwise, the host device 20 and the slave storage interface 50 may not desirably communicate in the absence of an appropriate support indicated at the diamond 104. Regardless of the availability of support for the slave storage interface 50, the host device 20 may communicate acceleratedly (e.g., benign or transparent) over the serialized link 80 through the slave storage interface 50 with the master storage device 75 at block 108 in accordance with some embodiments of the present invention.

Although being benign and transparent in the absence of the associated chipset driver 43, the slave storage interface 50, however, may connect to the chipset 35 and be identified by the chipset 35 when the associated chipset driver 43 is executing thereon. The host software 45 resident at the host controller 30 may send a communication or a command over the serialized link 80 from the chipset 35 (for example, a serial storage interface) for the slave storage interface 50 to interpret. In response, the host software 45 may cause the host controller 30 to communicate with the host device 20 via the serialized link 80.

The data bit 67 may indicate to the host controller 30 when and the manner in which to communicate over the serialized link 80, treating the serialized link 80 as a slave link to the slave storage interface 50. The serial link protocol 47 may define desired communication interactions of one or more master devices and/or slave devices that may exist on the serialized link 80 according to some examples of the present invention. In this way, the serialized link 80 may be configured to provide communications with the slave storage interface 50 and the master storage device 75, allowing both the slave storage interface 50 and the master storage device 75 to co-exist.

If a downstream device, i.e., the master storage device 75 is connected to the downstream port 85, the slave storage interface 50 may send an indication, for example, a device-to-host register frame information structure (FIS) with the "device present" bit set therein. The "device present" indication may adapt the data bit 67 in the register 65, setting the data bit 67 to an appropriate state (e.g., an active state). However, if a downstream device, i.e., the master storage device 75 is indicated to be not connected, then the slave storage interface 50 may form a device-to-host register FIS with the "device present" bit cleared, changing the state of the data bit 67 from an active to a non-active state.

In operation, with the data bit 67 set in the register 65, the host device 20 may send out a command on the serialized link 80, communicating with the slave storage interface 50. Upon receipt of the command, the slave storage interface 50 may interpret this command as a slave command, identifying itself to the host controller 30, in turn, to the chipset 35 in response. Using the command, in many implementations, a vendor-specific message may be conveyed for the purposes of self-identification of the slave storage interface 50. When the slave storage interface 50 successfully performs the self-identification, data transfers may occur to the host device 20.

In some embodiments of the present invention, the slave storage interface 50 may be capable of interpreting a set of slave commands without operating as a full-fledged device which typically is able to handle all commands consistent with a serial storage interface standard. Since the slave commands are specific to the slave storage interface 50 and provided in their vendor-specific space, the host software 45, which may not be aware of the existence of the slave storage interface 50 may still be able to function normally, although it may not be able to take advantage of some features made available by the slave storage interface 50.

Figure 3:
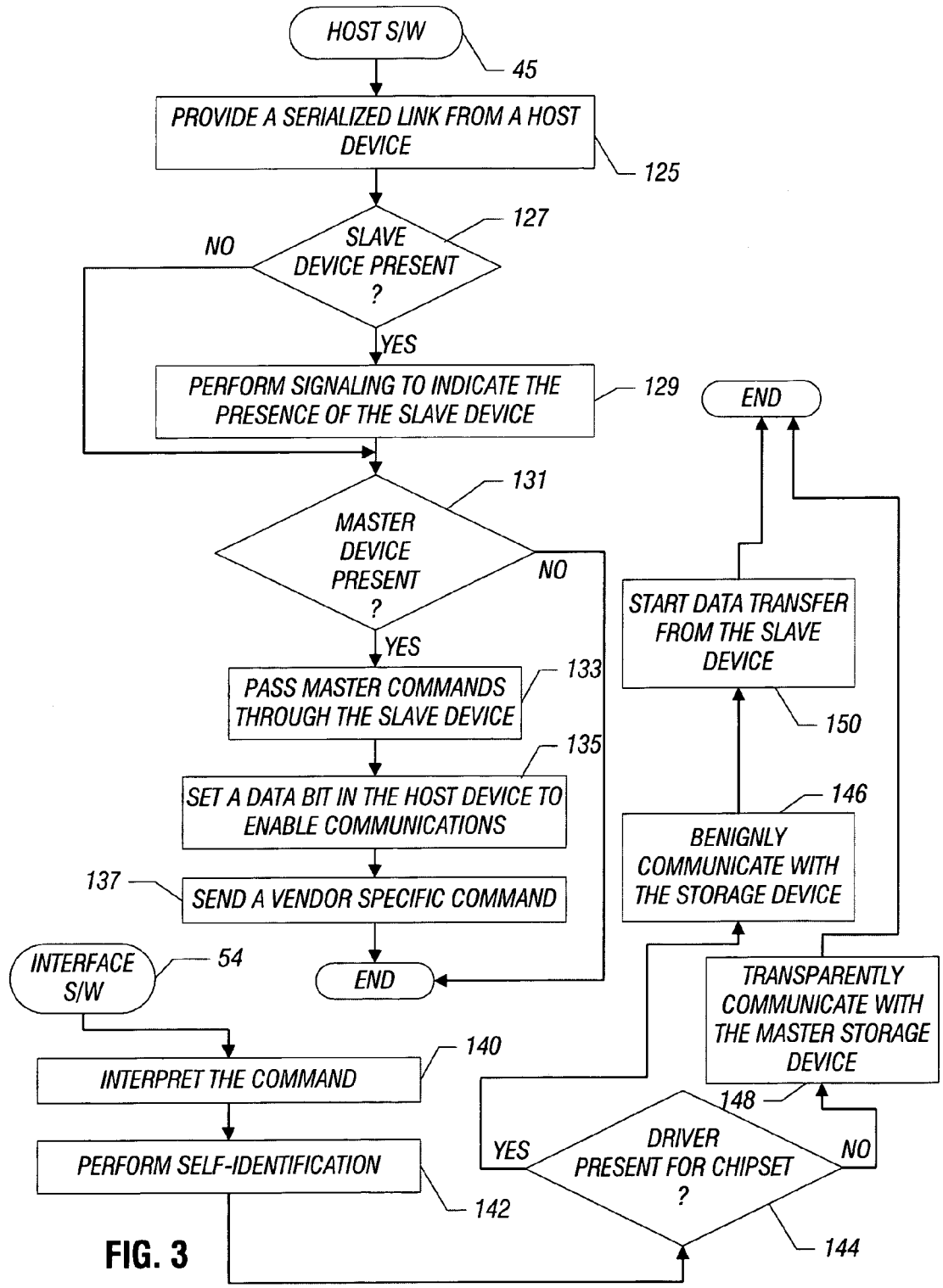
FIG. 3 is a flow chart for an interaction between the software utilized on the hardware controller and software utilized on the slave storage interface shown in FIG. 1 according to one embodiment of the present invention.

Turning now to FIG. 3, an interaction between the host software 45 and the interface software 54 is shown, in accordance with some embodiments of the present invention. At block 125, the serialized link 80 may be provided to serially connect one or more storage devices to the host device 20. A check at diamond 127 may determine the presence of at least one storage device. To indicate the presence of a slave device, e.g., the slave storage interface 50, signaling may be undertaken at block 129. In accordance with some embodiments of the present invention, out-of-band (OOB) signaling may be performed by the slave storage interface 50, indicating the presence thereof to the host device 20. In response to an appropriate OOB signaling, the host software 45 may determine the connection of the slave storage interface 50 to the host device 20.

A check at diamond 131 may determine whether or not a downstream device, i.e., the master storage device 75 may be connected downstream from the host device 20. If no master storage device 75 is indicated to be present at the diamond 131, the flow ends. However, when the master storage device 75 is indicated to be present at the diamond 131, one or more associated master commands may be passed through the slave storage interface 50 at block 133. Consistent with numerous embodiments of the present invention, for the master storage device 75, the slave storage interface 50 through the downstream port 85 may provide master commands at the device port 87, allowing both the slave storage interface 50 and the master storage device 75 to communicate on a same cable, i.e., on the serialized link 80.

The data bit 67 may be set in the host device 20 to perform accelerated communications at block 135. Within a vendor-specific command, an indication may be provided to the slave storage interface 50 at block 137, enabling self-identification thereof to the host device 20. Specifically, responses to the vendor-specific commands or messages may cause the host software 45 to set the data bit 67 in the host controller 30 for performing accelerated communications through the slave storage interface 50.

Using the interface software 54, the slave storage interface 50 may interpret the vendor-specific command at block 140. Self-identification by the slave storage interface 50 may be performed at block 142. In some embodiments of the present invention, connections to the chipset 35 from the slave storage interface 50 may be determined when the slave storage interface 50 is appropriately identified by the chipset 35 and the associated chipset driver 43 that is executing thereon.

A check at diamond 144 may determine whether or not a driver software, i.e., the chipset driver 43 is present for the chipset 35. When the chipset driver 43 is indicated to be absent at the diamond 144, the host device 20 may transparently communicate with the master storage device 75 at block 148. Conversely, if the chipset driver 43 is determined to be available for the chipset 35, benign communications with the master storage device 75 may be carried out over the serialized link 80 at block 146. Thereafter, data transfer may begin on the serialized link 80 at block 150 from the slave storage interface 50 because both the slave storage interface 50 and the master storage device 75 may co-exist on the serialized link 80, according to some embodiments of the present invention.

At some point, the host software 45 may set a new bit in the host device 20, enabling communications to the slave storage interface 50 on the serialized link 80 via the input/output (I/O) port 70. The host software 45 may build a vendor-specific command or message for the slave storage interface 50. Once the new bit, i.e., the data bit 67 is set in the host device 20, the host controller 30 may send a corresponding indication to the slave storage interface 50 via a slave command. If the slave storage interface 50 is not present or coupled to the host device 20, a finish indication without a data pattern may be returned by the master storage device 75, indicating that the vendor-specific command is not known thereto. However, when the slave storage interface 50 is present, the vendor-specific command may be appropriately interpreted and as a result, a data pattern identifying it as a slave device may be sent back to the host device 20. The host software 45, in turn, may interpret the data pattern as a successful command, indicating that the slave device is attached.

At the slave storage interface 50, one or more master commands associated with the master storage device 75 may additionally be received from the host device 20. The master commands may be passed to the master storage device 75 through the slave storage interface 50 over the serialized link 80. Specifically, the host software 45 may communicate to the downstream port 85 to which the master storage device 75 is connected, passing available master commands to the downstream port 85.

According to some embodiments of the present invention, the host software 45 may further communicate with the slave storage interface 50 using other vendor-specific commands, including commands for querying, settings features and performing data transfers while using the master commands to communicate with the downstream device, i.e., the master storage device 75. Although not so limited, in many embodiments of the present invention, a slave device attached over the serialized link 80 may not be recognized by the host device 20. For example, a legacy software may be executing as the host software 45 that may be unable to handle or build adequate commands for communicating with the slave storage interface 50. However, commands that target a downstream device, i.e., the master storage device 75, may still advantageously pass through the slave storage interface 50.

Figure 4:
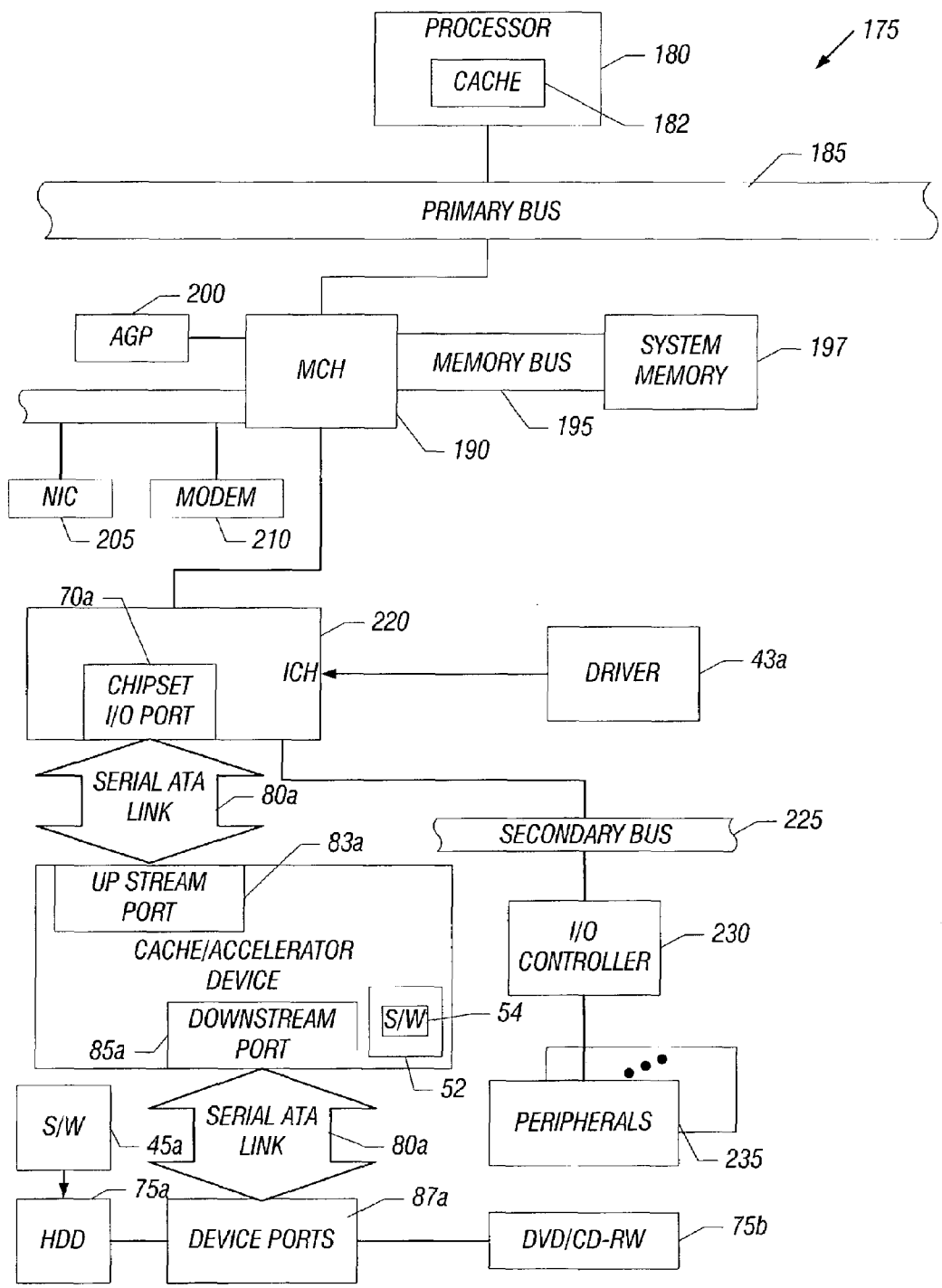
FIG. 4 is a schematic depiction of a host processor-based system consistent with one embodiment of the present invention.

Referring to FIG. 4, a processor-based system 175 may include a processor 180 incorporating a processor cache 182 coupled to a primary bus 185 which in turn couples to a memory controller hub (MCH) 190, according to some embodiments of the present invention. In one specific embodiment, the MCH 190 may couple to a system memory 197 which may be a dynamic random access memory (DRAM). In addition, the memory controller hub 190 may, in turn, be coupled to an input/output controller hub (ICH) 220. However, in other embodiments, different architectures may be deployed including those that use conventional bridges instead of the hub-based system illustrated in FIG. 4. Besides the system memory 197 coupled to a memory bus 195, the memory controller hub 190 may couple to an accelerated graphics port (AGP) 200. Using another bus, the memory controller hub 190 may also provide an interface to a network interface card (NIC) 205 and a modulator-demodulator (MODEM) 210.

Consistent with some embodiments, serial AT attachment (ATA) specification which describes a mechanism for a high-speed, high-performance interface for connecting storage devices such as hard disk drives may be deployed in storage systems, targeting a range of enterprise storage applications. The serial ATA specification is set forth by the Serial ATA Workgroup in a specification entitled, "Serial ATA: High Speed Serialized AT Attachment," Revision 1.0, published in August, 2001. Using this specification, in the processor-based system 175 serial interfacing of storage devices including hard disk drives, digital versatile drives may be provided in many embodiments of the present invention. It is to be understood that the use of serialized link 80 and the serial link protocol 47 in accordance with some embodiments entail accelerating parallel storage interface-compliant devices, such as parallel ATA based master/slave devices. Regardless, an example of the processor 180 includes a digital signal processor.

Accordingly, the input/output controller hub 220 may be coupled to a serial ATA link 80a. A driver 43a may be provided to operate chipset input/output (I/O) ports 70a at the input/output controller hub 220 in some embodiments of the present invention. The serial ATA link 80a may be, in turn, coupled to a storage device such as a cache/accelerator device 50a, which may operate as a disk cache in many instances. Using an upstream port 83a, the cache/accelerator device 50a may connect to the input/output controller hub 220 via the serial ATA link 80a. In the same way, using a downstream port 85a of the cache/accelerator device 50a, one or more storage devices, for example, a hard disk drive (HDD) 75a, a digital versatile disk (DVD) and/or a compact disk (CD) with read-write (RW) feature 75b may be coupled via device ports 87a.

The cache/accelerator device 50a, in some embodiments, may include a nonvolatile memory cache, which may be a polymer memory cache. However, the nonvolatile memory cache may be a polymer ferroelectric random access memory (PFRAM), which may be used as a large disk cache. The polymer memory cache involves polymer chains with dipole moments. Data may be stored by changing the polarization of a polymer between conductive lines. For example, a polymeric film may be coated with a large number of conductive lines. A memory located at a cross point of two lines is selected when the two transverse lines are both charged. Because of this characteristic, polymer memories are also sometimes referred to as cross point memories. Polymer memories may be advantageous since no transistors may be needed in some cases to store each bit of data and the polymer layers can be expanded to a large number of layers, increasing the memory capacity. In addition, the polymer memory is nonvolatile and has relatively fast read and write speeds. The polymer memory also has relatively low costs per bit and lower power consumption. Thus, the polymer memory has a combination of low costs and high capacity.

Some polymers that exhibit ferromagnetism may be used to form polymer memories. One such polymer is polyvinylidene fluoride (PVDF, whose repeat formula is ($CH_2$—$DF_2$)n) and some of its copolymers. Various polymers may be used to form the polymer memory structures, whether crystalline or spin-on. In one embodiment, the polymer memory is made from a ferroelectric polymer selected from polyvinyl and polyethylene fluorides, copolymers thereof, and combinations thereof. In another embodiment, the polymer memory is made from a ferroelectric polymer selected from polyvinyl and polyethylene chlorides, copolymers thereof, and combinations thereof. In another embodiment, the polymer memory is made from a ferroelectric polymer selected from polyacrylonitriles, copolymers thereof, and combinations thereof. In yet another embodiment, the polymer memory is made from a ferroelectric polymer selected from polyamides, copolymers thereof, and combinations thereof. Other embodiments may include combinations of the above that cross different types such a polyfluorides and polyamides or polyfluorides and polyacrylonitriles.

Software (S/W) or an application 45a may be stored on the HDD 75a in some cases to controllably connect multiple storage devices at the device ports 87a over the serial ATA link 80a. Of course, other applications may be loaded in the HDD 75a. The input/output controller hub 220 may couple a secondary bus 225 to an input/output (I/O) controller 230. The input/output controller 230 may, in turn, couple to one or more peripherals 235 according to one particular embodiment of the present invention.

The processor-based system 175 may have an advantage, in some embodiments, that performance of the processor-based system 175 may be enhanced at no loss of device connections to the storage devices, for example, the HDD 75a and the DVD/CD-RW 75b. In other embodiments, the same number of storage devices may be connected or present in the processor-based system 175 regardless of whether the slave device, i.e., the slave storage interface 50 is provided or not, however, with the slave device present, applications are accelerated. In other embodiments, the cache/accelerator device 50a may be added or connected to a processor-based device or a system with no loss in the chipset I/O ports 70a available for connecting serial ATA devices.

Increasingly media applications including digital audio, video and graphics have become pervasive in a variety of processor-based systems. With this trend continuing, single user and enterprise storage capacity requirements are growing at a tremendous rate. As a result, demand for data storage has exploded for a variety of user and enterprise storage applications that operate on servers, network storage systems, and desktop systems, as a few examples. Addition of mass storage drives or devices to the processor-based system 175 may provide storage solutions, addressing at least some of the storage-related challenges being faced according to some embodiments of the present invention.

Figure 5:
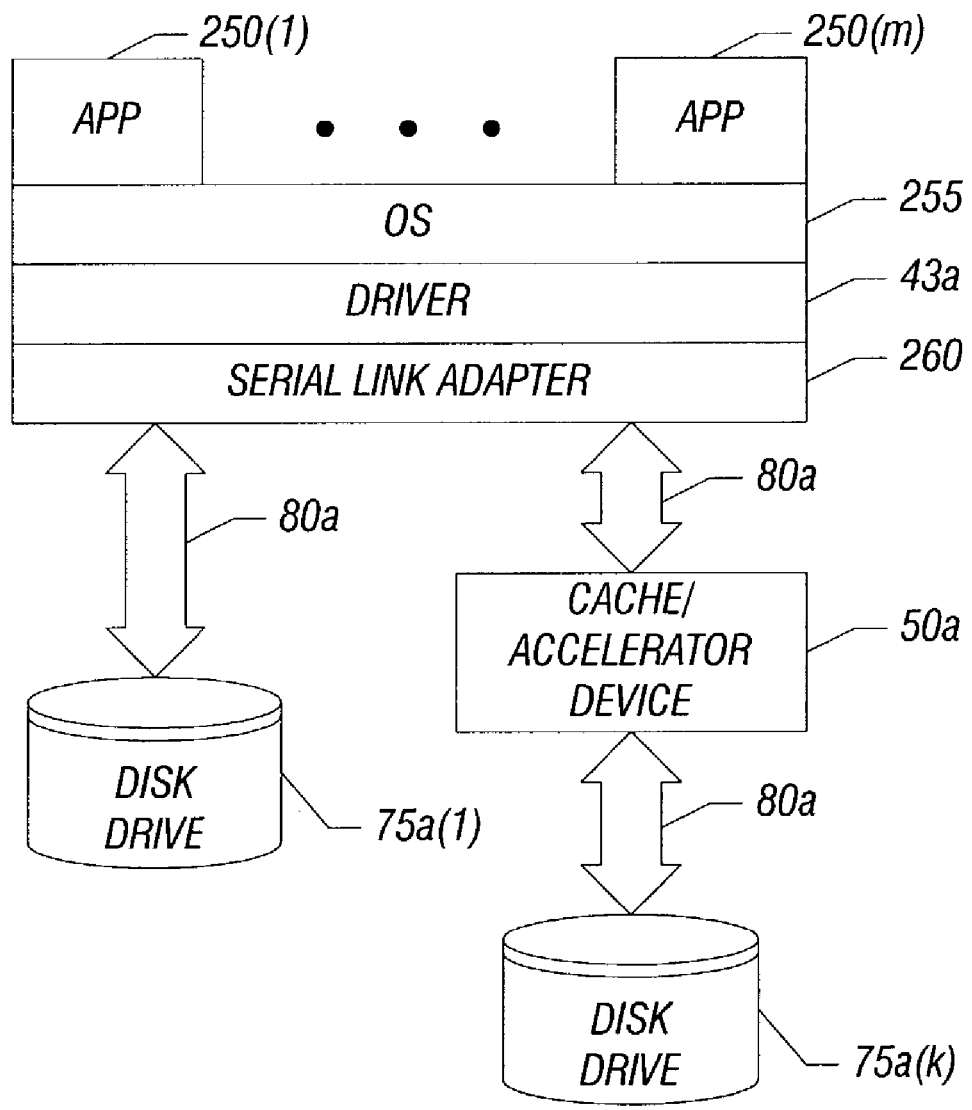
FIG. 5 shows serial connectivity for a disk drive using a cache/accelerator provided over the serialized link of FIG. 1 in accordance with an embodiment of the present invention.

Referring to FIG. 5, for the processor-based system 175 shown in FIG. 4, serial ATA connectivity illustrates connection of a slave device and one master device on a single port while another master device may be connected to another port using the serial ATA link 80a according to many embodiments of the present invention. More specifically, one or more applications 250(1) through 250(m) executing on a host operating system (OS) 255 may utilize the driver 43a, a serial link adapter 260 based on the serial link protocol 47 to serially connect multiple storage devices. That is, in this example, a disk drive 75a(1) may be directly connected on the serial ATA link 80a at one port. At the other port, a disk drive 75a(k) may be connected through the cache/accelerator drive 50a in accordance with the serial ATA specification, as an example, with no loss in ports available for other serial ATA compliant devices, enhancing system performance of the processor-based system 175.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining if a slave storage device, which is interposed between a host controller of a host device and a mass storage device coupled to the host device, is supported by the host device;
   communicating self-identification information between the slave storage device and the host device if the slave storage device is supported, otherwise not communicating the self-identification information between the slave storage device and the host device; and
   communicating between the host device and the mass storage device via passage through the slave storage device, if the slave storage device is not supported.

2. The method of claim 1, including:
   incorporating within a command for the slave storage device a communication to enable identification of the slave storage device to the host device, the command in response to out-of-band signaling by the slave storage device;
   sending the command from the host device to the slave storage device; and
   in response to the command, the slave storage device identifying itself to the host device.

3. The method of claim 2, including:
   configuring for the slave storage device a data bit in the host device;
   based on the data bit, sending in the communication a vendor-specific message for the slave storage device to interpret; and
   transferring data from the slave storage device in response to the identifying.

4. The method of claim 1, further comprising transferring data stored in the slave storage device if the slave storage device is supported.

5. The method of claim 1, including:
   using the host controller to operate a chipset in conjunction with a driver to enable the communication between the chipset and the slave storage device; and
   determining if the driver is provided with the chipset.

6. The method of claim 1, further comprising caching data from the mass storage device in the slave storage device, the slave storage device corresponding to a disk cache.

7. The method of claim 6, further comprising providing the cached data from the slave storage device to the host controller.

8. A link for serial data transfer comprising:
a slave storage device including non-volatile storage and an interface, the slave storage device interposed between a mass storage device and a processor-based device to enable self-identification communication between the interface and the processor-based device in response to out-of-band signaling by the interface; and
a storage in the processor-based device to store at least one data bit having two or more states indicative of a connection of the interface to the processor-based device, wherein one state of the two or more states is to indicate presence of support by the processor-based device for communication with both the interface and the mass storage device.

9. The link for serial data transfer of claim 8, wherein the support comprises a driver associated with a controller to enable the processor-based device for the communication.

10. The link for serial data transfer of claim 9, wherein a second state of the two or more states is to indicate absence of the driver.

11. The link for serial data transfer of claim 8, wherein the interface includes:
an upstream port to couple with the processor-based device; and
a downstream port to couple with the mass storage device.

12. The link for serial data transfer of claim 8, wherein the mass storage device to co-exist with the interface, and receive from the processor-based device communications including one or more master commands associated with the mass storage device.

13. The link for serial data transfer of claim 8, wherein the processor-based device to set the at least one data bit and send a command over the link for the interface to interpret.

14. The link for serial data transfer of claim 13, wherein the processor-based device to communicate within the command a vendor-specific message for the interface.

15. A processor-based system comprising:
a processor;
a link for serial data transfer including a disk cache interposed between a chipset of the system and a disk storage device; and
a storage of the chipset to store an indicator associated with the disk cache to enable pass through communications over the link between the system and the disk cache based on the indicator, wherein the disk storage device to co-exist with the disk cache and to receive from the system and through the disk cache the pass through communications including one or more master commands associated with the disk storage device.

16. The processor-based system of claim 15, wherein the storage comprises an adaptable register to indicate at least one of active or non-active states for the indicator.

17. The processor-based system of claim 15, wherein the disk cache includes:
an upstream port to couple with the chipset; and
a downstream port to couple with the disk storage device.

18. The processor-based system of claim 17, wherein the processor to set the indicator and send a command with a communication message over the link for the disk cache to interpret.

19. The processor-based system of claim 15, wherein the disk cache is a ferroelectric memory.

20. The processor-based system of claim 15, wherein the disk cache is a polymer memory.

21. The processor-based system of claim 15, wherein the disk cache is a polymer ferroelectric random access memory.

22. The processor-based system of claim 15, further comprising a second disk storage device coupled to a second link without interposing of the disk cache.

23. An article comprising a medium storing instructions that, if executed enable a system to:
determine if a slave storage device, which is interposed between a host controller of a host device and a mass storage device coupled to the host device, is supported by the host device;
enable communication of self-identification information between the slave storage device and the host device if the slave storage device is supported, otherwise not enable the communication of the self-identification information between the slave storage device and the host device; and
communicate between the host device and the mass storage device via passage through the slave storage device if the slave storage device is not supported.

24. The article of claim 23, including instructions that if executed enable the system to:
use the host controller to operate a chipset in conjunction with a driver to enable the self-identification communication; and
determine if the driver is provided with the chipset.

25. A link for serial data transfer comprising:
a disk cache interposed between a chipset of a system and a disk storage device to enable communication of self-identification information between the chipset and the disk cache if the disk cache is supported by the system, and to enable communication between the chipset and the disk storage device via passage through the disk cache if the disk cache is not supported by the system.

26. The link of claim 25, wherein the disk cache is a ferroelectric memory.

27. The link of claim 25, wherein the disk cache is a polymer memory.

28. The link of claim 25, wherein the disk cache is a polymer ferroelectric random access memory.

29. The link of claim 25, further comprising a second disk storage device coupled to the system via a second link, wherein the disk cache is not interposed between the chipset and the second disk storage device.

* * * * *